United States Patent
Karner

(10) Patent No.: US 9,545,685 B2
(45) Date of Patent: Jan. 17, 2017

(54) METHOD FOR PRODUCING A WELDED JOINT

(71) Applicant: MAGNA STEYR Engineering AG & Co KG, Graz (AT)

(72) Inventor: Werner Karner, Graz (AT)

(73) Assignee: MAGNA STEYR Engineering AG & Co KG, Graz (AT)

( * ) Notice: Subject to any disclaimer, the term of this patent is extended or adjusted under 35 U.S.C. 154(b) by 262 days.

(21) Appl. No.: 14/289,209

(22) Filed: May 28, 2014

(65) Prior Publication Data

US 2014/0353287 A1    Dec. 4, 2014

(30) Foreign Application Priority Data

May 28, 2013  (EP) ..................... 13169455
Jun. 11, 2013  (EP) ..................... 13171348

(51) Int. Cl.
| | |
|---|---|
| B23K 9/00 | (2006.01) |
| B23K 35/38 | (2006.01) |
| B23K 11/16 | (2006.01) |
| B23K 15/00 | (2006.01) |
| B23K 9/28 | (2006.01) |
| B23K 9/173 | (2006.01) |
| B23K 9/23 | (2006.01) |
| B23K 9/16 | (2006.01) |
| B23K 35/28 | (2006.01) |

(52) U.S. Cl.
CPC ............ *B23K 9/173* (2013.01); *B23K 9/164* (2013.01); *B23K 9/23* (2013.01); *B23K 9/232* (2013.01); *B23K 35/286* (2013.01); *B23K 2203/10* (2013.01)

(58) Field of Classification Search
CPC .......... B23K 9/164; B23K 9/173; B23K 9/23; B23K 9/232; B23K 35/286
USPC ....................... 219/74, 117.1, 118, 121.11–121.14, 219/137.2, 146.22
See application file for complete search history.

(56) References Cited

U.S. PATENT DOCUMENTS

| | | | | |
|---|---|---|---|---|
| 4,880,709 A | * | 11/1989 | Holroyd ............... | B23K 35/002 219/146.22 |
| 6,440,583 B1 | * | 8/2002 | Ueno ................... | B23K 35/286 148/439 |
| 7,329,828 B2 | * | 2/2008 | Spriestersbach ..... | B23K 1/0056 219/121.46 |
| 2007/0045260 A1 | * | 3/2007 | Feng ..................... | B23K 9/025 219/137 WM |
| 2007/0221631 A1 | * | 9/2007 | Ruokolainen ........ | B23K 9/173 219/121.11 |
| 2009/0294410 A1 | * | 12/2009 | Iwase ................... | B21J 15/025 219/91.23 |
| 2010/0001133 A1 | | 1/2010 | Kempa | |
| 2010/0224609 A1 | * | 9/2010 | Rose .................... | B23K 9/022 219/137 R |
| 2012/0233859 A1 | * | 9/2012 | Cattiez ................. | B21D 26/021 29/889.7 |
| 2014/0183166 A1 | * | 7/2014 | Keong .................. | B60B 3/02 219/74 |
| 2014/0190952 A1 | * | 7/2014 | Anderson ............ | B23K 35/383 219/146.22 |
| 2016/0059340 A1 | * | 3/2016 | Hill ...................... | B23K 35/28 428/596 |

FOREIGN PATENT DOCUMENTS

| | | |
|---|---|---|
| CN | 101745751 A | 6/2010 |
| CN | 101941119 A | 1/2011 |
| CN | 102 049 591 A | 5/2011 |
| CN | 102112263 A | 6/2011 |
| CN | 102126064 A | 7/2011 |
| CN | 102500853 A | 6/2012 |
| CN | 102528303 A | 7/2012 |
| KR | 2012 0031857 A | 4/2012 |

\* cited by examiner

*Primary Examiner* — Dana Ross
*Assistant Examiner* — Lindsey C Staubach
(74) *Attorney, Agent, or Firm* — Jordan IP Law, LLC; Todd A. Vaughn

(57) ABSTRACT

A method for producing a welded joint between a high-strength aluminum alloy with a copper proportion as a first metal and a second metal, in which the welded joint is produced by CMT welding.

13 Claims, No Drawings

METHOD FOR PRODUCING A WELDED JOINT

CROSS-REFERENCE TO RELATED APPLICATIONS

The present application claims priority 35 U.S.C. §119 to European Patent Publication No. EP 13169455.6 (filed on May 28, 2013), and European Patent Publication No. EP 13171348.9 (filed on Jun. 11, 2013), which are each hereby incorporated by reference in their respective entireties.

TECHNICAL FIELD

Embodiments relate to a method for producing a welded joint between a high-strength aluminium alloy with a copper proportion as a first metal and a second metal.

BACKGROUND

For high-strength aluminium alloys of this type, such as alloys from the 7075 group, it is known that fusion welding processes such as arc welding cannot be employed successfully on account of the copper content in the alloys. Therefore, use is commonly made of more complex processes for joining these metals.

By way of example, U.S. Pat. No. 5,769,306 discloses a special friction welding process for aluminium alloys of this type.

Japanase Patent Publication JPH1147959 A discloses friction stir welding for high-strength aluminium alloys.

Particularly in vehicle construction, it would be desirable for it to be possible to produce lighter vehicle bodies by joining, for example, steel and high-strength aluminium and to replace relatively heavy steel parts with high-strength aluminium parts. These high-strength aluminium alloys, in particular aluminium alloys from the 7075 group, have been used to date predominantly in aircraft construction, in which case they are riveted—and therefore the problem of the lack of weldability arises to a lesser extent in aircraft construction.

SUMMARY

Embodiments relate to the use of high-strength aluminium alloys, such as, for example, aluminium alloys from the 7075 group, in motor vehicle construction.

Embodiments relate to a method of manufacturing a motor vehicle having a lightweight constructon and for which it may be possible to have a connection to steel parts.

Embodiments relate to a method for producing a welded joint between a high-strength aluminium alloy with a copper proportion as a first metal and a second metal which is easy to carry out and produces a reliable joint.

Embodiments relate to a method for producing a welded joint between a high-strength aluminium alloy with a copper proportion as a first metal and a second metal, in which the welded joint is produced by metal inert gas (MIG) welding, in particular by cold metal transfer (CMT) welding.

In accordance with embodiments, a method for producing a joint may include at least one of: providing a high-strength aluminium alloy with a copper proportion as a first metal and a second metal; and producing a welded joint between the first metal and the second metal via metal inert gas welding.

A special form of this welding process is CMT welding, an arc welding process developed by Fronius. In accordance with embodiments, it has been found that MIG welding, and in particular CMT welding, despite the latter being a fusion welding process, may be utilized, when suitably employed, for welding high-strength aluminium alloys with a copper proportion. In this case, CMT welding is not limited to welding with direct current, but instead this is also to be understood as including welding with alternating current, for example "CMT Advanced" from Fronius.

DESCRIPTION

In accordance with embodiments, the high-strength aluminium alloy with the copper proportion may comprise a 7075 aluminium alloy, as a result of which the otherwise favorable properties of this alloy may be utilized for components which are nevertheless easy to weld. In accordance with embodiments, the high-strength aluminium alloy of the first metal may also be a 7020 aluminium alloy.

The second metal may be an aluminium alloy, and in particular, the second metal may also be a high-strength aluminium alloy without a copper proportion. In accordance with embodiments, the second metal may comprise a 7075 aluminium alloy or a 7020 aluminium alloy. The second metal may also be a steel sheet, and therefore a joint in accordance with embodiments may be produced, for example, between an aluminium alloy from the 7075 group and a steel sheet. To this end, the steel sheet may be commonly galvanized beforehand.

In order to achieve the best welding results, a welding wire which comprises an aluminium alloy having the alloying proportions Mn 0.2-2% and Zr 0.01-0.8% may be used for the CMT welding. It particularly, the aluminium alloy of the welding wire may comprise the alloying proportions Si<0.5%, Fe<0.7%, Cu<0.2%, Mn 0.2-2%, Mg 1.0-8.0%, Cr<0.4%, Ti<0.3%, Zn<0.4%, Zr 0.01-0.4%.

A CMT welding machine having a torch position at a pushing angle in a range of between of 5 to 15 degrees may be used for the CMT welding. A welding speed in a range of between of 0.05 to 1 m/min may be used for the CMT welding.

The first metal and/or the second metal may be a metal sheet, in particular, with a metal sheet thickness of approximately max. 4 mm. "Metal sheet" is understood here to mean components which extend areally but have substantially the same thickness. In accordance with embodiments, areal blanks made of 7075 material, similar to sheet-metal plates, may be welded together with 7075 or 7020 or other aluminium alloys or steel sheets as the second metal and then shaped in order to obtain a structural component, in particular for vehicle construction.

A welding wire having a diameter of 1.2 mm may be used for the CMT welding. A welding wire which comprises an aluminium alloy having the alloying proportions Si 0.2%, Fe 0.35%, Cu 0.02%, Mn 1.5%, Mg 5.5%, Cr 0.15%, Ti 0.1%, Zn 0.2%, Zr 0.25% may be used for the CMT welding.

Embodiments make it possible to produce a welded joint between a high-strength aluminium alloy with a copper proportion as a first metal and a second metal in a simple and reliable manner.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims

What is claimed is:

1. A method for producing a joint, the method comprising:
providing a high-strength aluminum alloy with a copper proportion as a first metal, wherein the first metal comprises a 7075 aluminum alloy;
providing a second metal;
producing a welded joint between the first metal and the second metal via inert gas welding, wherein producing a welded joint between the first metal and the second metal comprises conducting cold metal transfer welding using a welding wire comprising an aluminum alloy having alloying proportions of Si<0.5%, Fe<0.7%, Cu<0.2%, Mn 0.2-2%, Mg 1.0-8.0%, Cr<0.4%, Ti<0.3%, Zn<0.4% and Zr 0.01-0.4%.

2. The method of claim 1, wherein the second metal comprises an aluminum alloy.

3. The method of claim 1, wherein the second metal comprises a high-strength aluminum alloy without a copper proportion.

4. The method of claim 1, wherein the second metal comprises a 7075 aluminum alloy.

5. The method of claim 1, wherein the second metal comprises a 7020 aluminum alloy.

6. The method of claim 1, wherein the second metal comprises steel.

7. The method of claim 1, wherein the second metal comprises a steel sheet.

8. The method of claim 1, wherein producing a welded joint between the first metal and the second metal comprises conducting cold metal transfer welding using a torch position at a pushing angle in a range of between 5 to 15 degrees.

9. The method of claim 1, wherein producing a welded joint between the first metal and the second metal comprises conducting cold metal transfer welding using a welding speed in a range of between 0.05 to 1 m/min.

10. The method of claim 1, wherein the producing a welded joint between the first metal and the second metal comprises conducting cold metal transfer welding using a welding wire having a diameter of 1.2 mm.

11. The method of claim 1, wherein at least one of the first metal and the second metal comprises a metal sheet.

12. A method for producing a joint, the method comprising:
providing a high-strength aluminum alloy with a copper proportion as a first metal, wherein the first metal comprises a 7020 aluminum alloy;
providing a second metal;
producing a welded joint between the first metal and the second metal via inert gas welding, wherein producing a welded joint between the first metal and the second metal comprises conducting cold metal transfer welding using a welding wire comprising an aluminum alloy having alloying proportions of 0.2-2.0% Mn and 0.01-0.8% Zr.

13. A method for producing a joint, the method comprising:
providing a high-strength aluminum alloy with a copper proportion as a first metal, wherein the first metal comprises a 7020 aluminum alloy;
providing a second metal;
producing a welded joint between the first metal and the second metal via inert gas welding, wherein producing a welded joint between the first metal and the second metal comprises conducting cold metal transfer welding using a welding wire comprising an aluminum allow having alloying proportions of Si 0.2%, Fe 0.35%, Cu 0.02%, Mn 1.5%, Mg 5.5%, Cr 0.15%, Ti 0.1%, Zn 0.2% and Zr 0.25%.

* * * * *